United States Patent
Unruh

(10) Patent No.: US 11,303,758 B2
(45) Date of Patent: Apr. 12, 2022

(54) SYSTEM AND METHOD FOR GENERATING AN IMPROVED REFERENCE SIGNAL FOR ACOUSTIC ECHO CANCELLATION

(71) Applicant: Knowles Electronics, LLC, Itasca, IL (US)

(72) Inventor: Andrew D. Unruh, San Jose, CA (US)

(73) Assignee: Knowles Electronics, LLC, Itasca, IL (US)

( * ) Notice: Subject to any disclaimer, the term of this patent is extended or adjusted under 35 U.S.C. 154(b) by 21 days.

(21) Appl. No.: 16/885,298

(22) Filed: May 28, 2020

(65) Prior Publication Data

US 2020/0382649 A1 Dec. 3, 2020

Related U.S. Application Data

(60) Provisional application No. 62/853,960, filed on May 29, 2019.

(51) Int. Cl.
| | |
|---|---|
| *H04B 3/21* | (2006.01) |
| *H04M 9/08* | (2006.01) |
| *G10L 21/0232* | (2013.01) |
| *H04R 3/04* | (2006.01) |

(Continued)

(52) U.S. Cl.
CPC ......... *H04M 9/082* (2013.01); *G10L 21/0232* (2013.01); *H04B 3/21* (2013.01); *H04R 3/04* (2013.01); *H04R 29/001* (2013.01); *G10L 2021/02082* (2013.01)

(58) Field of Classification Search
CPC .............. G10K 11/168; G10K 11/178; G10L 21/0208; G10L 21/0232; G10L 2021/02082; G10L 15/22; G10L 19/008; G10L 21/0224; G10L 21/0264; G10L 25/30; G10L 25/78; H04B 3/21; H04B 3/234; H04M 9/082; H04R 3/005; H04R 3/02; H04R 3/04; H04R 29/001; B32B 7/12; G06F 3/162; H03G 3/02
USPC ............ 379/406.01, 406.05, 406.07, 406.08, 379/406.14; 381/66, 71.7; 348/245; 370/252; 375/376

See application file for complete search history.

(56) References Cited

U.S. PATENT DOCUMENTS

| | | | | |
|---|---|---|---|---|
| 4,609,787 A | * | 9/1986 | Horna ....................... | H04B 3/23 379/406.08 |
| 5,680,450 A | * | 10/1997 | Dent ..................... | H04M 9/082 379/406.08 |

(Continued)

*Primary Examiner* — Gerald Gauthier

(74) *Attorney, Agent, or Firm* — Loppnow & Chapa; Matthew C. Loppnow; Roland K. Bowler, II

(57) ABSTRACT

Systems and methods for improved acoustic echo cancellation are provided. In various embodiments, a microphone located in the loudspeaker enclosure provides a first signal that is used to estimate the loudspeaker displacement which is proportional to the sound pressure level (SPL) inside the enclosure. A second signal is then derived by mapping the displacement to the loudspeaker's force factor (Bl(x)) and then modulating this by a measured current to a voice coil inside the speaker to provide an estimate of the force acting on the moving mass of the loudspeaker. The first signal is highly correlated with the echo signal for low frequencies and the second signal is highly correlated with the echo signal for high frequencies. The two signals are then combined to provide a single improved AEC reference signal.

20 Claims, 5 Drawing Sheets

(51) Int. Cl.
   *H04R 29/00*       (2006.01)
   *G10L 21/0208*     (2013.01)

(56) References Cited

U.S. PATENT DOCUMENTS

| | | | | |
|---|---|---|---|---|
| 5,721,771 A * | 2/1998 | Higuchi | ........... | H04M 9/08 |
| | | | | 379/388.02 |
| 5,828,756 A * | 10/1998 | Benesty | ........... | H04M 9/082 |
| | | | | 381/66 |
| 6,160,886 A * | 12/2000 | Romesburg | ........... | H04M 9/082 |
| | | | | 379/406.05 |
| 9,111,525 B1 * | 8/2015 | Mouchtaris | ........... | G10L 19/008 |
| 9,659,555 B1 * | 5/2017 | Hilmes | ........... | G10K 11/002 |
| 9,754,605 B1 * | 9/2017 | Chhetri | ........... | G10L 21/0264 |
| 9,818,425 B1 * | 11/2017 | Ayrapetian | ........... | G10L 15/30 |
| 9,978,387 B1 * | 5/2018 | Pogue | ........... | G10L 21/0208 |
| 10,013,995 B1 * | 7/2018 | Lashkari | ........... | H04M 9/082 |
| 10,229,698 B1 * | 3/2019 | Chhetri | ........... | G10L 21/0208 |
| 10,355,658 B1 * | 7/2019 | Yang | ........... | H03G 3/002 |
| 10,622,004 B1 * | 4/2020 | Zhang | ........... | G10L 21/0232 |
| 10,622,009 B1 * | 4/2020 | Zhang | ........... | G06N 20/00 |
| 10,636,435 B1 * | 4/2020 | Doyle | ........... | G10L 21/0208 |
| 10,650,840 B1 * | 5/2020 | Solbach | ........... | H04R 3/02 |
| 10,657,981 B1 * | 5/2020 | Mansour | ........... | H04R 1/2873 |
| 10,694,309 B1 * | 6/2020 | Vautrin | ........... | H04R 3/04 |
| 10,937,418 B1 * | 3/2021 | Chatlani | ........... | G10L 15/22 |
| 10,937,441 B1 * | 3/2021 | Kristjansson | ........... | G10L 21/0208 |
| 2006/0098810 A1 * | 5/2006 | Kim | ........... | H04M 9/082 |
| | | | | 379/406.14 |
| 2007/0280472 A1 * | 12/2007 | Stokes, III | ........... | H04S 7/305 |
| | | | | 379/406.01 |
| 2008/0069283 A1 * | 3/2008 | Casorso | ........... | G11B 20/10037 |
| | | | | 375/376 |
| 2008/0117317 A1 * | 5/2008 | Mentzer | ........... | H04N 5/3745 |
| | | | | 348/245 |
| 2008/0159551 A1 * | 7/2008 | Harley | ........... | H04M 9/082 |
| | | | | 381/66 |
| 2009/0046866 A1 * | 2/2009 | Feng | ........... | H04M 9/082 |
| | | | | 381/66 |
| 2009/0141907 A1 * | 6/2009 | Kim | ........... | G10L 21/0208 |
| | | | | 381/71.7 |
| 2012/0140939 A1 * | 6/2012 | Hwang | ........... | H04M 9/082 |
| | | | | 381/66 |
| 2013/0301452 A1 * | 11/2013 | Yoon | ........... | H04L 5/0035 |
| | | | | 370/252 |
| 2015/0288807 A1 * | 10/2015 | Mani | ........... | H04M 1/20 |
| | | | | 379/406.07 |
| 2016/0352915 A1 * | 12/2016 | Gautama | ........... | H04R 3/02 |
| 2017/0208391 A1 * | 7/2017 | Shah | ........... | H04M 9/082 |
| 2019/0043519 A1 * | 2/2019 | Rosenkiewicz | ........... | H04R 3/00 |
| 2019/0051299 A1 * | 2/2019 | Ossowski | ........... | G10L 15/08 |
| 2019/0318756 A1 * | 10/2019 | Liu | ........... | H04R 3/04 |
| 2020/0382649 A1 * | 12/2020 | Unruh | ........... | H04R 29/001 |
| 2021/0237394 A1 * | 8/2021 | Huang | ........... | F16F 7/1017 |

\* cited by examiner

SYSTEM AND METHOD FOR GENERATING AN IMPROVED REFERENCE SIGNAL FOR ACOUSTIC ECHO CANCELLATION

TECHNICAL FIELD

The present invention relates generally to the field of communication acoustic signals over a network.

BACKGROUND

Acoustic echo can happen during a conversation via a communication network. The far end signal coming into a communication device can be played back by a loudspeaker of the communication device. A microphone of the communication device can capture both a near end signal (e.g., speech of a near end listener) and an output of the loudspeaker. The mixture of the near end signal and output of the loudspeaker can be transmitted back to the far end, so that a listener at the far end can receive a delayed version of his own speech as an "echo" sound.

Conventional acoustic echo cancellation (AEC) techniques work well for cancelling a linear echo from the playback of the far end signal, while attempts to further remove nonlinear components of the echo typically result in distortion of the desired portions of the far end signal, such as speech. Meanwhile, use of a small loudspeaker (such as those provided in conventional smart phones, etc.) is likely to result in a larger than usual nonlinear component in the acoustic echo. Accordingly, there is a growing need for an AEC solution that can address these and other issues.

SUMMARY

Systems and methods for improved acoustic echo cancellation are provided. In various embodiments, a microphone located in the loudspeaker enclosure provides a first signal that is used to estimate the loudspeaker displacement which is proportional to the sound pressure level (SPL) inside the enclosure. A second signal is then derived by mapping the displacement, for any specific frequency, to the loudspeaker's force factor (Bl(x)) and then modulating this by a measured current to a voice coil inside the speaker to provide an estimate of the force acting on the moving mass of the loudspeaker. The first signal is highly correlated with the echo signal for low frequencies and the second signal is highly correlated with the echo signal for high frequencies. The two signals are then combined to provide a single improved AEC reference signal. In some embodiments, even further signals are derived and combined to provide the single improved AEC reference signals.

DETAILED DESCRIPTION

Figure 1:
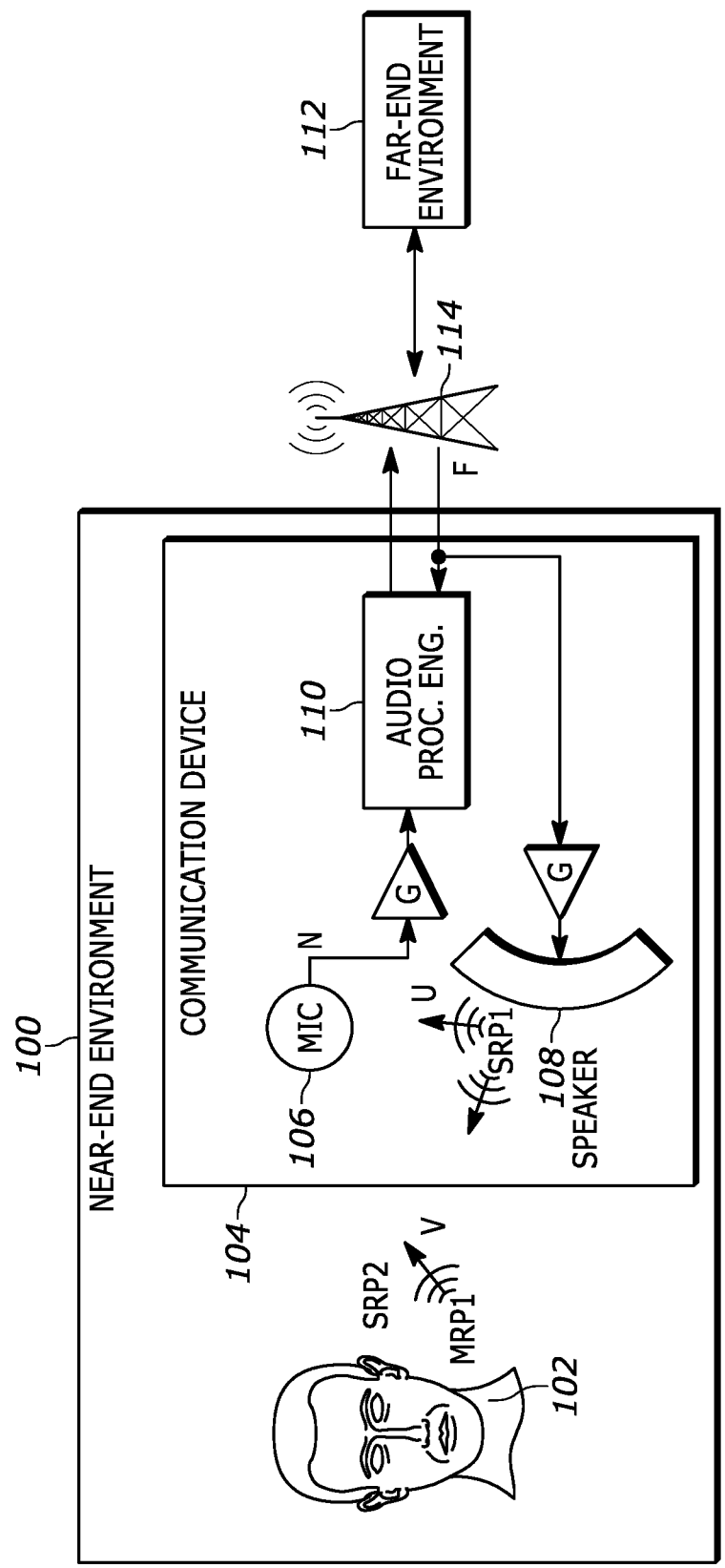
FIG. 1 is a block diagram illustrating an environment in which systems and methods for acoustic echo cancellation can be practiced, according to various example embodiments.

The present disclosure generally relates to an improved reference signal for AEC and barge-in, using a microphone inside the loudspeaker cavity. According to some aspects, the improved AEC reference signal provides better AEC performance even when the loudspeaker is driven loudly, which typically is when it is most needed. In the present embodiments, the improved AEC reference signal is at least a combination of a low frequency (LF) reference signal and a high frequency (HF) reference signal.

In various embodiments, the frequency components of the acoustic signal of interest may be broadly divided into two categories: high frequency (HF) comprising high frequency components and low frequency (LF) comprising low frequency components. In one embodiment, frequencies up to 1 kHz may be considered as low frequency components and frequencies equal to or greater than 1 kHz may be considered as high frequency components. The components in each category may be further divided into various frequency bands (bins). In some embodiments, the frequency bins may be predefined for the entire audio frequency range.

The LF reference signal may be generated by generating for all LF components, an optimal transfer function between the signal from the microphone internal to the enclosure and the echo derived using a standard system identification technique (LMS optimization), and further filtering the output of the transfer function using a low pass filter. The HF reference signal may be generated based on an example algorithm explained below.

According to certain aspects, the pressure inside the loudspeaker enclosure is nearly proportional to the displacement of the loudspeaker due to the adiabatic compression. For frequencies whose wavelength is large compared to the dimensions of the enclosure, the pressure inside the enclosure is proportional to the second time integral of the pressure variation outside the enclosure caused by the motion of the loudspeaker drivers. Thus, the internal SPL provides a useful AEC reference. For a sealed enclosure, it is also true that for frequencies whose wavelength is large compared to the dimensions of the enclosure, the pressure inside the enclosure is proportional to the displacement of the loudspeaker. For higher order systems such as vented and passive radiator systems, the pressure inside the enclosure can also be related to the displacement of the loudspeaker in a slightly more complicated manner.

According to certain other aspects, the HF reference signal of the present embodiments is proportional to the diaphragm acceleration which in turn is proportional to the SPL outside the enclosure of the loudspeaker. Therefore, in some embodiments, the HF reference signal may be generated by calculating for all the HF components, a displacement of the speaker using the internal microphone signal, further estimating a force factor, multiplying the estimated force factor by the current to calculate the diaphragm acceleration, generating an optimal transfer function between the acceleration values and the echo derived using a standard system identification technique (LMS optimization), and further filtering the output of the transfer function using a high pass filter.

In one embodiment, a first order Butterworth low pass filter may be used to generate the LF reference signal and a first order Butterworth high pass filter may be used to generate the HF reference signal. In another embodiment, a fourth order Butterworth high pass filter may be used on the HF reference signal and a supplementary filter may be used on the LF signal. The HF and LF reference signals are then compared and combined to generate the improved AEC reference signal in such a way that the phase and the magnitude in the crossover region is not changed. The AEC reference signal may then be used to generate an audio output signal substantially devoid of any echo. In other embodiments, various HF and LF reference signals may be generated. For each frequency bin and each frame, the reference signal is the one that results in the lowest residual signal.

With an improved AEC reference signal according to embodiments disclosed herein, depending on, and as a function of, the amount of distortion in the echo, at least a 6.4 dB improvement may be seen in the present echo cancellation as compared to using the standard reference signal according to existing methods.

Referring now to FIG. 1, an environment 100 in which various embodiments disclosed herein may be practiced is shown. A user in a near-end environment 100 acts as an acoustic source 102 to a communication device 104 (e.g., a mobile phone, a hearable device or smart speaker, an IoT device, etc.).

In various embodiments, communication devices may also include: radio frequency (RF) receivers, transmitters, and transceivers; wired and/or wireless telecommunications and/or networking devices; amplifiers; audio and/or video players; encoders; decoders; speakers; inputs; outputs; storage devices; and user input devices. Communication devices may include input devices such as buttons, switches, keys, keyboards, trackballs, sliders, touch screens, one or more microphones, gyroscopes, accelerometers, global positioning system (GPS) receivers, and the like. Communication devices may further include output devices such as LED indicators, video displays, touchscreens, speakers, and the like.

The exemplary communication device 104 comprises one or more microphones 106, a speaker 108 (or multiple speakers), and an audio processing system 110 including an acoustic echo cancellation mechanism. In some embodiments, a mouth of the acoustic source 102 (e.g., the user) is near the microphone(s) 106 and an ear of the acoustic source 102 (e.g., the user) is near the speaker(s) 108. The microphones 106 are configured to pick up audio from the acoustic source 102, but may also pick up noise from the near-end environment 100. The audio received from the acoustic source 102 will comprise a near-end microphone signal N, which will be sent back to a far-end environment 112.

A far-end signal F comprising speech from the far-end environment 112 may be received via a communication network 114 by the communication device 104. The received signal F may then be provided to the near-end environment 100 via the speaker(s) 108. The audio output from the speaker(s) 108 may leak back into (e.g., be picked up by) the microphone(s) 106. This leakage may result in an echo perceived at the far-end environment 112.

For each of the microphone(s) 106, audio processing system 110 is preferably configured to remove U (which represent echoes of F) from N, while preserving a near-end voice signal V. In some embodiments, the echoes U include main echoes and residual echoes. The main echoes refer to acoustic signals that are output by the speaker 108 and then immediately picked up by the microphone(s) 106. The residual echoes refer to acoustic signals that are output by the speaker 108, bounced (acoustically reflected) by objects in the near-end environment 100 (e.g., walls), and then picked up by the microphone(s) 106.

The removal of U from N is preferably performed without introducing distortion of V to a far-end listener. This may be achieved by applying one or more cancellation filters (i.e., acoustic echo cancellers) to the near end signal N that render the acoustic echo inaudible. As set forth above, conventional AEC techniques can work well for cancelling a linear echo from N. Meanwhile, conventional techniques that further attempt to remove nonlinear components of the echo from N typically result in undesirable side effects such as speech distortion.

Meanwhile, various factors can compel the need for addressing the cancellation of the nonlinear component of the echo. For example, the use of a small loudspeaker (such as those provided in conventional smart phones having a radius of less than 0.7 cm, etc.) is likely to result in a larger than usual nonlinear component in the acoustic echo. Moreover, when loudspeakers are driven hard, they exhibit high levels of distortion requiring more nonlinear echo cancellation and thus resulting in more speech distortion.

Some techniques are known for generating a reference signal that can be used for performing AEC. One technique (described in U.S. Pat. No. 10,045,122, the contents of which are incorporated herein by reference in their entirety) includes placing a microphone in an enclosure of the speaker to generate a reference signal for performing AEC. However, further improvements to these and other techniques are needed for effective cancellation of the nonlinear component of the echo signal, while not adversely affecting the cancellation of the linear part of the echo.

Figure 2:
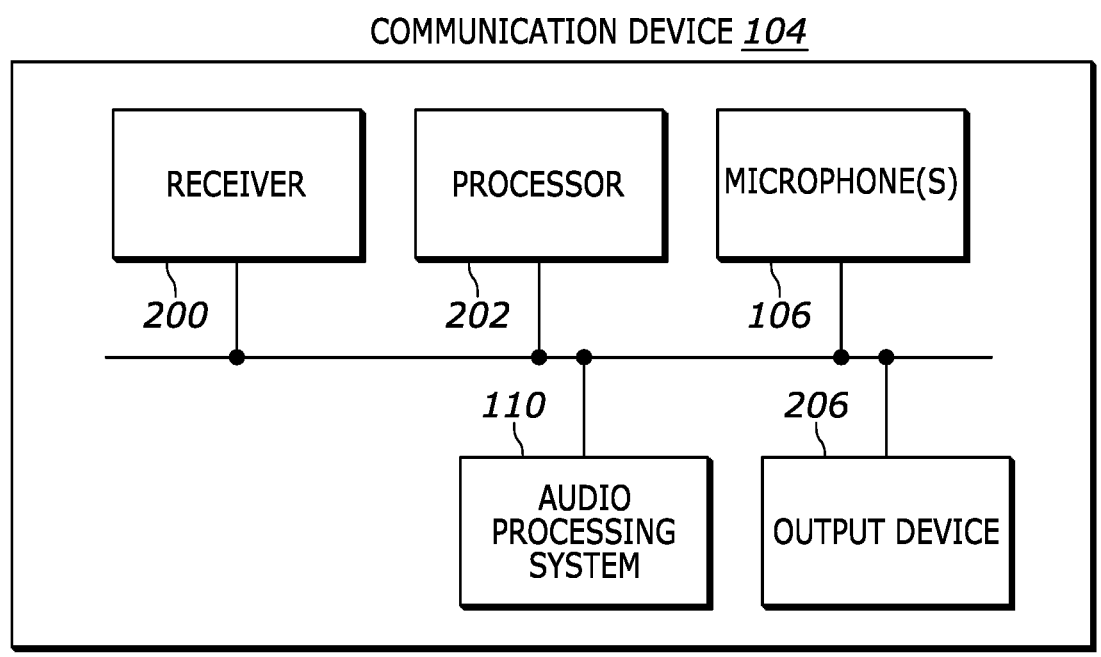
FIG. 2 is a block diagram illustrating a communication device, according to an example embodiment.

Referring now to FIG. 2, the exemplary communication device 104 is shown in further detail. In exemplary embodiments, the communication device 104 is or includes an audio device that comprises a receiver 200, a processor 202, the microphone(s) 106, the audio processing system 110, and an output device 206. The communication device 104 may comprise more or other components necessary for operations of the communication device 104. Similarly, the communication device 104 may comprise fewer components that perform similar or equivalent functions to the components illustrated in FIG. 2.

Processor 202 may include one or more processors (e.g., CPUs) that may execute software and/or firmware stored in memory (not shown) to partially or fully perform the AEC methods and operations discussed herein. In additional or alternative embodiments, processor 202 may also or instead perform other functions for the communication device 104 which are not necessarily related to the methodologies of the present embodiments.

The exemplary receiver 200 (e.g., a networking component) is configured to receive the far-end signal F from the network 114. The receiver 200 may be a wireless receiver or a wired receiver. In some embodiments, the receiver 200 may comprise an antenna device. The received far-end signal F may then be forwarded to the audio processing system 110 and the output device 206.

The audio processing system 110 can receive acoustic signals from the acoustic source 102 via the microphone(s) 106 (e.g., acoustic sensors) and process the acoustic signals. After reception by the microphone(s) 106, the acoustic signals may be converted into electric signals. The electric signals may be converted by, e.g., an analog-to-digital converter (not shown) into digital signals for processing in accordance with some embodiments. It should be noted that embodiments of the present technology may be practiced utilizing any number of microphones.

Output device 206 provides an audio output to a listener (e.g., the acoustic source 102). For example, output device 206 may comprise speaker 108, which can be disposed in an earpiece of a headset, or handset on the communication device 104.

Figure 3:
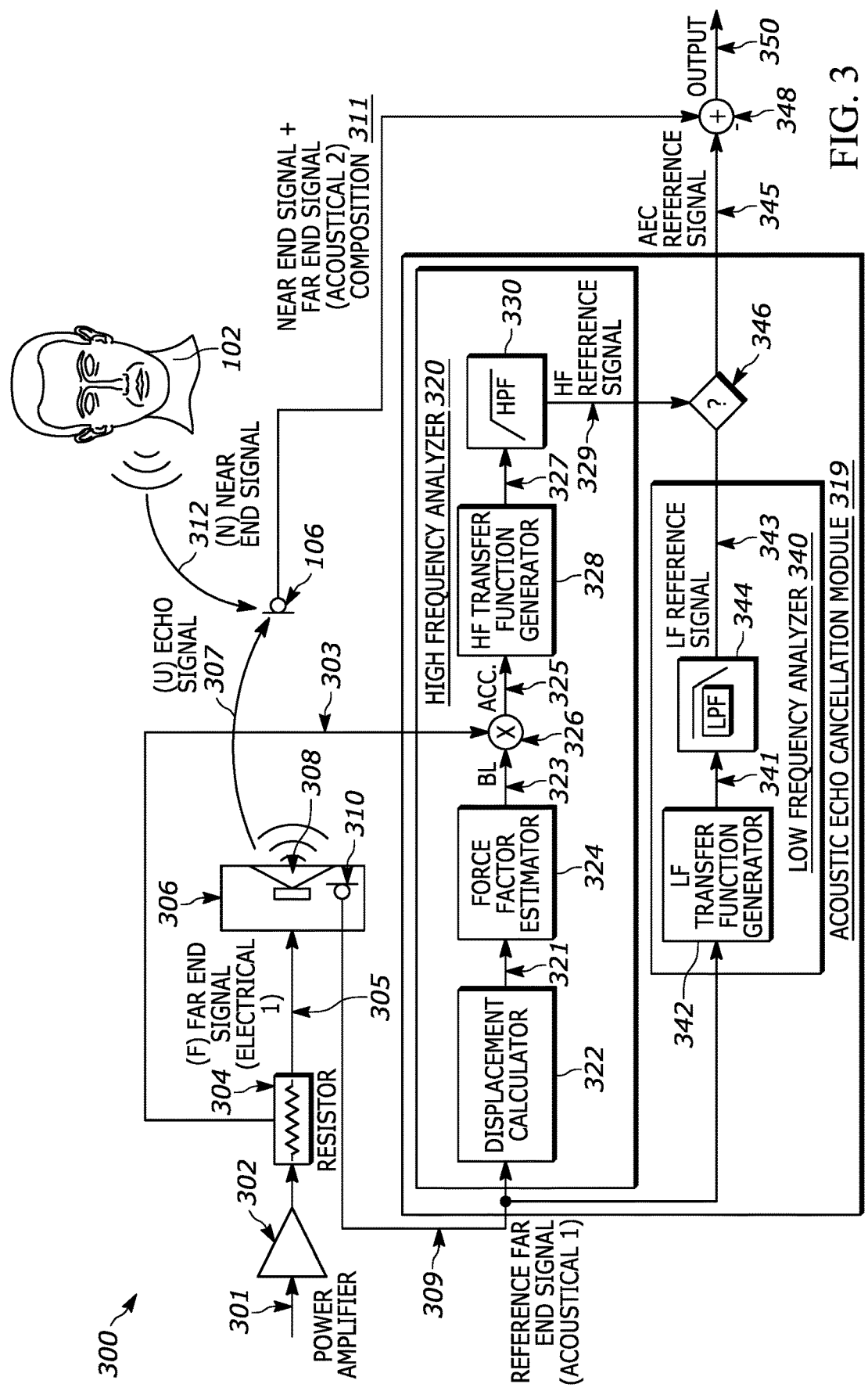
FIG. 3 shows an example system for acoustic echo cancellation, according to various example embodiments.

FIG. 3 is a block diagram showing an example system 300 in which techniques for acoustic echo cancellation can be practiced, according to example embodiments. The system 300 can include a loudspeaker 308 (e.g., implementing one of speaker(s) 108 of system 110), an enclosure 306 of the loudspeaker 308, a reference microphone 310, a microphone 106, amplifier 302, a resistor 304, an acoustic echo cancellation (AEC) module 319, and a summing module 348. The AEC module 319 further comprises a high frequency analyzer 320, a low frequency analyzer 340 and a combination block 346. The HF analyzer 320 further comprises a displacement calculator 322, a force factor estimator 324, a multiplier 326, an HF transfer function generator 328, and a high pass filter 330. The LF analyzer 340 further comprises an LF transfer function generator 342 and a low pass filter 344. In some embodiments, the system 300 is implemented as part of the communication device 104 (shown in FIG. 1 and FIG. 2).

In various embodiments, the loudspeaker 308 is operable to receive a far end signal 305 via an amplifier 302 and a resistor 304; and play back a corresponding audio output which may also be referred to as an echo signal 307. The far end signal 305 is a form of the signal F shown in FIG. 1. As can be appreciated, the signal 305 that is used to drive speaker 306 is an electrical signal and may be referred to as an electrical far end signal. Further, the echo signal 307 that is output from speaker 306 is an acoustic signal and may be referred to as an acoustic far end signal. In certain embodiments, the far end signal 305 is received during a conversation via the audio communication network 114 (shown in FIG. 1) and initially processed via the audio processing system 110 (shown in FIG. 2).

In various embodiments, the microphone 106 is operable to capture a near end signal 312 from a sound source, for example, the user 102. The near end signal 312 is the signal N shown in FIG. 1. After processing by the audio processing system 110, the near end signal 312 can be transmitted via the audio communication network 114 to another user at a far end site. As set forth above, since the microphone 106 also captures the echo signal 307 played by the loudspeaker 308, another user at the far end site can hear not only the user 102, but also the echo signal 307. In other words, the user at the far end site can hear a composite signal 311 which includes both the near end signal 312 and the echo signal 307. Therefore, the echo signal 307 (the "echo") needs to be removed or attenuated from a composite signal 311.

In some conventional audio echo cancellation methods, the far end signal 305 is used as a reference signal to attenuate the echo signal 307 in the composite signal 311 captured by microphone 106. The far end signal 305 can be filtered and the filtered signal is subtracted from the composite signal 311. As set forth above, the conventional methods work well when the echo signal 307 and the far end signal 305 are substantially related by a linear function. However, if a nonlinear component is present in the echo signal 307, conventional methods may not cancel all of the "echo" using the far end signal 305 as the reference.

According to various example embodiments, a reference microphone 310 is placed inside the loudspeaker's enclosure 306. The reference microphone 310 is operable to capture a reference far end signal 309. In embodiments, and as described in U.S. Pat. No. 10,045,122, given the high sound pressure levels above 160 db SPL inside the enclosure, microphone 310 can be a high AOP, or low sensitivity microphone that is suitable for use with these high sound pressure levels. Reference far end signal 309 includes nonlinear components since it is based on output of the loudspeaker 308. In some embodiments, the reference far end signal 309 is processed with an amplifier (not shown) and provided to an AEC module 319.

Although the present embodiments will be described in more detail below in connection with the illustrated example of using a microphone inside the enclosure, other alternatives are possible. For example, the microphone can be placed outside the enclosure, very close to the loudspeaker and its signal is used as the AEC reference signal (e.g. signal 309). This microphone is preferably used in conjunction with another microphone farther from the loudspeaker, otherwise the near end will be cancelled along with the echo. An advantage of this embodiment is its simplicity. As long as one only adapts the canceller in the presence of a far end signal, it works fine and the microphone near the speaker can be used as the only AEC reference. A disadvantage of this embodiment is there will always be some near end speech attenuation.

As explained above, the AEC module 319 is operable to receive the reference far end signal 309 and output the AEC reference signal 345. The reference far end signal 309 may also be referred to as an initial reference signal and the AEC reference signal 345 may be referred to as a final reference signal. The AEC reference signal 345 is a combination of a HF reference signal 329 and an LF reference signal 343, as will be described in more detail below.

In some embodiments, the frequency components of the reference far end signal 309 may be broadly divided into two categories: high frequency (HF) comprising high frequency components and low frequency (LF) comprising low frequency components. In one embodiment, frequencies up to 1 kHz may be considered as low frequency components and frequencies equal to or greater than 1 kHz may be considered as high frequency components. The components in either or both category may be further divided into various frequency bands (bins). In some embodiments, the frequency bins may be predefined for the entire audio frequency range.

According to aspects mentioned above, HF analyzer 320 is configured to generate an HF reference signal 329 that considers nonlinearities associated with the production of the echo signal 307 by loudspeaker 308 when driven by far end electrical signal 305. In this regard, the nonlinear equation governing loudspeaker motion may be given by:

$$\frac{\text{Voltage}(t) - Bl(x) * \dot{x}}{\text{DC Resistance}(t)} Bl(x) = \qquad (1)$$

$$\text{mass} * \ddot{x} + \text{Damping} * \dot{x} + \text{SpringConst}(x) * x$$

where
x=the displacement of the loudspeaker,
ẍ=the diaphragm acceleration of the loudspeaker,
Bl=the product of magnetic field strength in the voice coil gap and the length of wire in the magnetic field, for example in tesla-meters (T·m).

At high frequencies, the equation above reduces to the equation 2 given below:

$$\text{current}(t) * Bl(x) = \text{mass} * \ddot{x} \qquad (2)$$

From the equation 2 above, it may be inferred that the diaphragm acceleration ẍ is proportional to the product of the loudspeaker's force factor (Bl) and the current through the voice coil. In other words, the SPL outside the loudspeaker is proportional to the product of the Bl and the current. This can be used as an AEC reference signal for the mass controlled (non-low frequency) region of the loudspeaker.

Given that the force factor Bl is a function of x, the loudspeaker displacement, a first step according to an embodiment is to determine the loudspeaker displacement x. Accordingly, as shown in FIG. 3, in the HF analyzer 320, the displacement calculator 322 is configured to receive the reference far end signal 309 from the reference microphone 310 and output a displacement signal (e.g. a value of x) to the force factor (FF) estimator 324. For example, the pressure inside a sealed enclosure is nearly proportional to the displacement of the loudspeaker (Adiabatic Compression). So if the signal inside the enclosure decreases by 12 dB/octave, then the displacement of the loudspeaker will decrease by 12 dB/octave above resonance. In this manner, the internal pressure represented by the reference far end signal 309 is used to obtain the loudspeaker displacement x. This value is provided to the FF estimator 324. For other types of enclosures, such as ported or passive radiators, it is also possible to relate displacement to internal pressure, but the relationship is not as straightforward as it is for a sealed enclosure.

Figure 5:
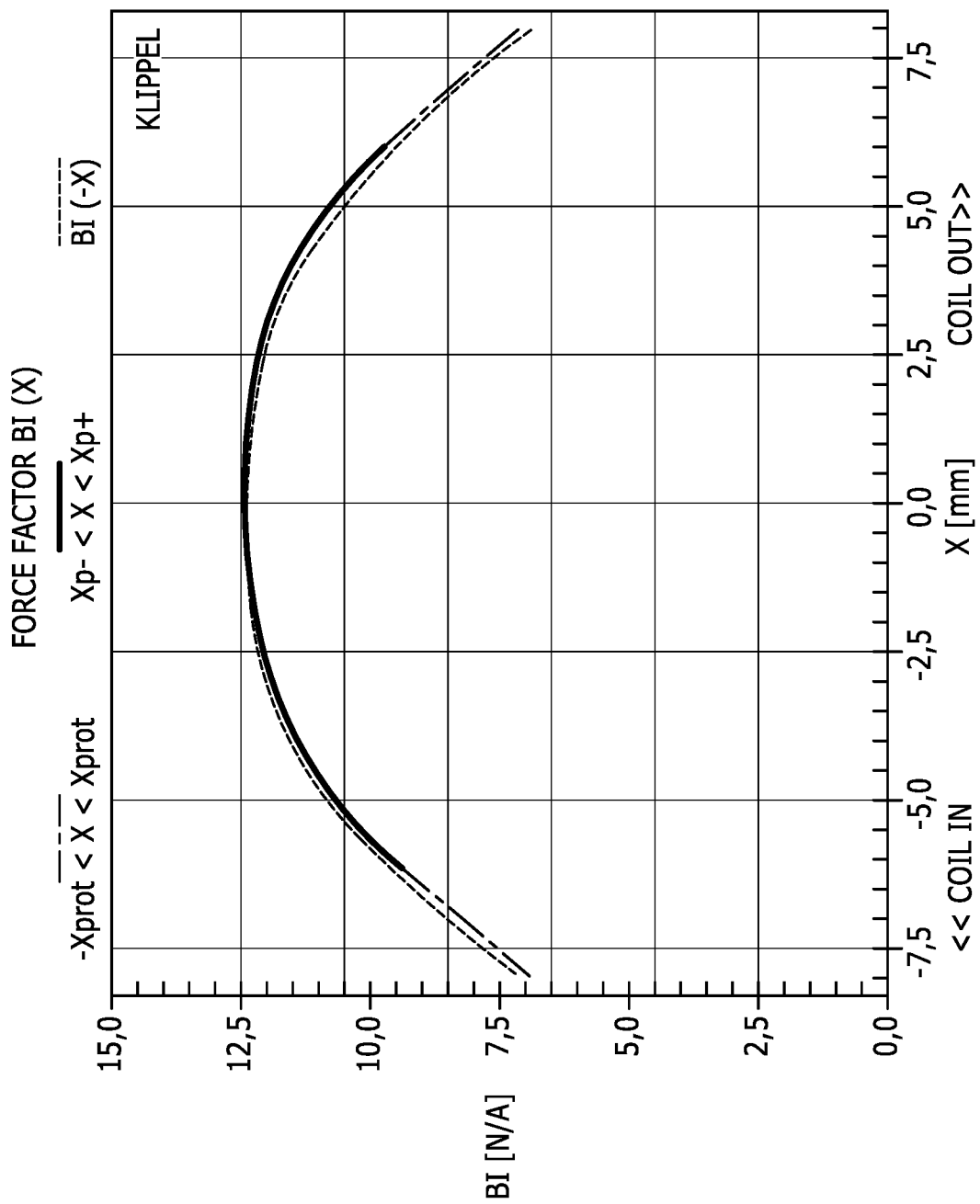
FIG. 5 is a graph illustrating an example force factor versus displacement curve according to an embodiment.

FF estimator 324 generates or stores a force factor function Bl(x) that relates force factor values for any given instantaneous displacement of the loudspeaker, or any values proportional thereto. In one embodiment, the force factor function Bl(x) may be estimated indirectly by finding the polynomial coefficients (or other function that describes Bl as a function of x) that, when fed with the microphone signal and then multiplied by the current, provide the highest coherence with the echo signal. In other embodiments, the force factor Bl(x) may also be calculated directly using standard measurement methods. For example, assuming the moving mass of the loudspeaker is known, then the force factor of a loudspeaker may be calculated by analyzing the frequency dependent impedance of the loudspeaker. To determine the dependence of the force factor on the displacement (rather than just the rest position of the loudspeaker), a slightly more sophisticated method may be employed such as offsetting the loudspeaker diaphragm with an offset DC voltage or current or slightly pressurizing or evacuating an enclosure, measuring the displacement, and then measuring the impedance. For the set of impedance curves (each curve representing some diaphragm displacement, the Bl vs displacement curve may be derived). An example Bl curve (y-axis) as a function of loudspeaker displacement (x-axis) is given in FIG. 5. In any event, the FF estimator 324 is configured to use the instantaneous displacement x from the displacement calculator 322 (or any value proportional to displacement) and the force factor function Bl(x) and output a BL signal 323 representative of, or proportional to, the magnetic flux density and the effective length of the wire in that magnetic flux.

As set forth above in connection with equation 2, the diaphragm acceleration $\ddot{x}$ is proportional to the product of the loudspeaker's force factor (Bl) and the current through the voice coil. Accordingly, multiplier 326 is configured to receive the BL signal 323 and a current signal 303 (e.g. as measured from a voltage drop across resistor 304) and to output an acceleration signal representing the acceleration of the diaphragm. According to aspects of the embodiments, the acceleration signal 325 may represent, based on the HF components, the best estimated value of a diaphragm acceleration for a particular echo.

HF transfer function generator 328 receives the acceleration signal 325 and generates a transfer function that is used to produce a signal 327 which closely matches the HF components of echo signal 307. In embodiments HF transfer function generator 328 performs a fast Fourier transform (FFT) on the acceleration signal 325, which produces complex amplitudes for each of a plurality of frequency bins (e.g. 512), which bins preferably span an audible range of 16 kHz (e.g., each bin is spaced apart by 30 Hz). Auto and cross correlation values from the FFT are used to form a frequency-by-frequency transfer function which is applied to the FFT amplitude outputs to produce final values for each frequency bin, which final values are produced as signal 327. It should be noted that values from the FFT, and thus the values of the signal 327, are generated on a frame-by-frame basis (i.e. for each given set of discrete time-domain samples of signal 309).

The high pass filter 330 is operable to filter the output signal 327 of the HF transfer function generator 328 and to further generate the HF reference signal 329, which represents the values of the HF components of output signal 327 that most closely match the echo signal 307. In one embodiment, HPF 330 is a first order Butterworth high pass filter. In other embodiments, HPF 330 is a fourth order Butterworth high pass filter may.

In the LF analyzer 340, the LF transfer function generator 342 is operable to receive the reference far end signal 309 and output a signal 341 which closely matches the LF components of echo signal 307. Similar to HF transfer function generator 328, LF transfer function generator 342 performs a fast Fourier transform (FFT) on the reference far end signal 309, which produces complex amplitudes for each of a plurality of frequency bins (e.g. 512), which bins preferably span an audible range of 16 kHz (e.g., each bin is spaced apart by 30 Hz). Auto and cross correlation values from the FFT are used to form a frequency-by-frequency transfer function which is applied to the FFT amplitude outputs to produce final values for each frequency bin, which final values are produced as signal 341.

The low pass filter 344 is operable to filter the output signal 341 of the LF transfer function generator 342 and to further generate the LF reference signal 343, which represents the values of the LF components of output signal 341 that most closely match the echo signal 307. In one embodiment, LPF 344 is a first order Butterworth low pass filter. In another embodiment, LPF 344 is a supplementary filter.

In some embodiments, high pass filter 330 and low pass filter 344 have a common cutoff frequency (e.g. 1 kHz). In these and other embodiments, values of HF reference signal 329 in frequency bins below the cutoff frequency are discarded, while values of LF reference signal 343 in frequency bins above the cutoff frequency of LF reference signal 343 are discarded. As such, in these embodiments, block 346 merely combines the non-discarded values of HF reference signal 329 and LF reference signal 343 for the frequency bins above and below cutoff frequency, respectively to form AEC reference signal 345. In other embodiments, rather than or in addition to the above processing, block 346 performs a combination between HF reference signal 329 and LF reference signal 343 in a manner such that the phase and magnitude values for each frequency bin in the crossover region around the cutoff frequency are not changed.

In turn, summer 348 performs an FFT to form a frequency domain representation of composite signal 311 using the same FFT parameters as used in blocks 328 and 342. Summer 348 then performs a bin-by-bin subtraction of the values of AEC reference signal 345 from the frequency domain representation of composite signal 311. The difference signal can be converted back to the time domain using an IFFT to produce the output signal 350, which includes substantially only the captured near end signal 312 (e.g., speech of the user 102). In other embodiments, an IFFT is not performed and the output signal 350 is in frequency domain form.

In other embodiments, a different approach is used to form the AEC reference signal 345. In this approach, HPF 330 and LPF 344 are not used, and instead block 346 forms the AEC reference signal 345 using HF signal 327 and LF signal 341. Block 346 does this by performing a frequency bin-by-bin selection between the frequency components of HF signal 327 and LF signal 341. For example, for each frequency bin, decision block 346 computes the residual echo for both of HF signal 327 and LF signal 341 and obtains residual echo values for all frequency bins associated with both HF signal 327 and LF signal 341. For each frequency bin, block 346 then selects the signal value from HF signal 327 or LF signal 341 having the lowest associated residual echo. After the selection of component values from HF signal 327 and LF signal 341 for all frequency bins has been performed, the aggregate component values are combined to form the AEC reference signal 345. In one example, the residual echo values are computed by subtracting the signal value of HF signal 327 or LF signal 341 from the predicted echo for the given frequency bin.

In other embodiments, instead of a single LF and a single HF reference, several additional references including any one or more of: (1) the standard reference signal used in other approaches (e.g. a frequency domain representation of the signal that goes to the power amplifier (301)); (2) a voltage sense signal which is the frequency domain representation of either A) the voltage output of the power amplifier 302 or B) the voltage input to the loudspeaker (305), which, in the time domain is often provided by smart power amplifiers (PAs); or (3) a current sense signal (e.g. a signal proportional to signal 303, which is voltage across resistor 304). Accordingly, for every frame, the signal that provides the lowest residual echo is generated using any one of the above signals for every frequency bin. So, instead of just choosing between two reference signals 341 and 327, these embodiments further choose between one or more of the signal at 303 (i.e. current reference), the output of the power amp (e.g., measured after 302 or at 305), and the standard reference signal 301. The term "residual echo" herein refers to the amount of echo left over after the AEC ref signal 345 is subtracted from the composite signal 311, except that the output 350 will also contain near end signal 312 that is not counted in the residual echo. In other words, it is the amount of echo that is left over after the cancellation.

In yet other possible embodiments, instead of a single LF reference and a single HF reference, the standard reference signal is used (e.g. a frequency domain representation of the signal that goes to the power amplifier (301)), together with any of (1) a voltage sense signal which is the frequency domain representation of the voltage output of the power amplifier 302 (2) the voltage input to the loudspeaker (305), which, in the time domain is often provided by smart power amplifiers (PAs); or (3) a current sense signal (e.g. a signal proportional to signal 303, which is voltage across resistor 304). Then, as in the previous embodiment, for every frame, the signal that provides the lowest residual echo is generated using these signals for every frequency bin. A disadvantage of this approach is that non-linearities are not properly accounted for at high frequencies, but only low frequencies. On the other hand, an advantage is that the algorithm is much lighter in the sense that it is less complex and computationally more efficient.

In still other embodiments, the two signals 329 and 343 may be combined to generate an average or to otherwise generate the AEC reference signal 345 which may best represent a value of echo factor to be subtracted from the composite signal 311.

From all of the above, it may be appreciated that the AEC reference signal 345 represents the unwanted echo portion which needs to be removed from the composite signal 311. The summing module 348 is configured to receive the AEC reference signal 345 and the echo signal 307; and further subtract the AEC reference signal 345 representing the unwanted echo from the composite signal 311 and to output the signal 350 substantially devoid of any echo. The summing module 348 is adapted to attenuate, using the final reference signal 345, the far end component in the composite signal 311.

Figure 4:
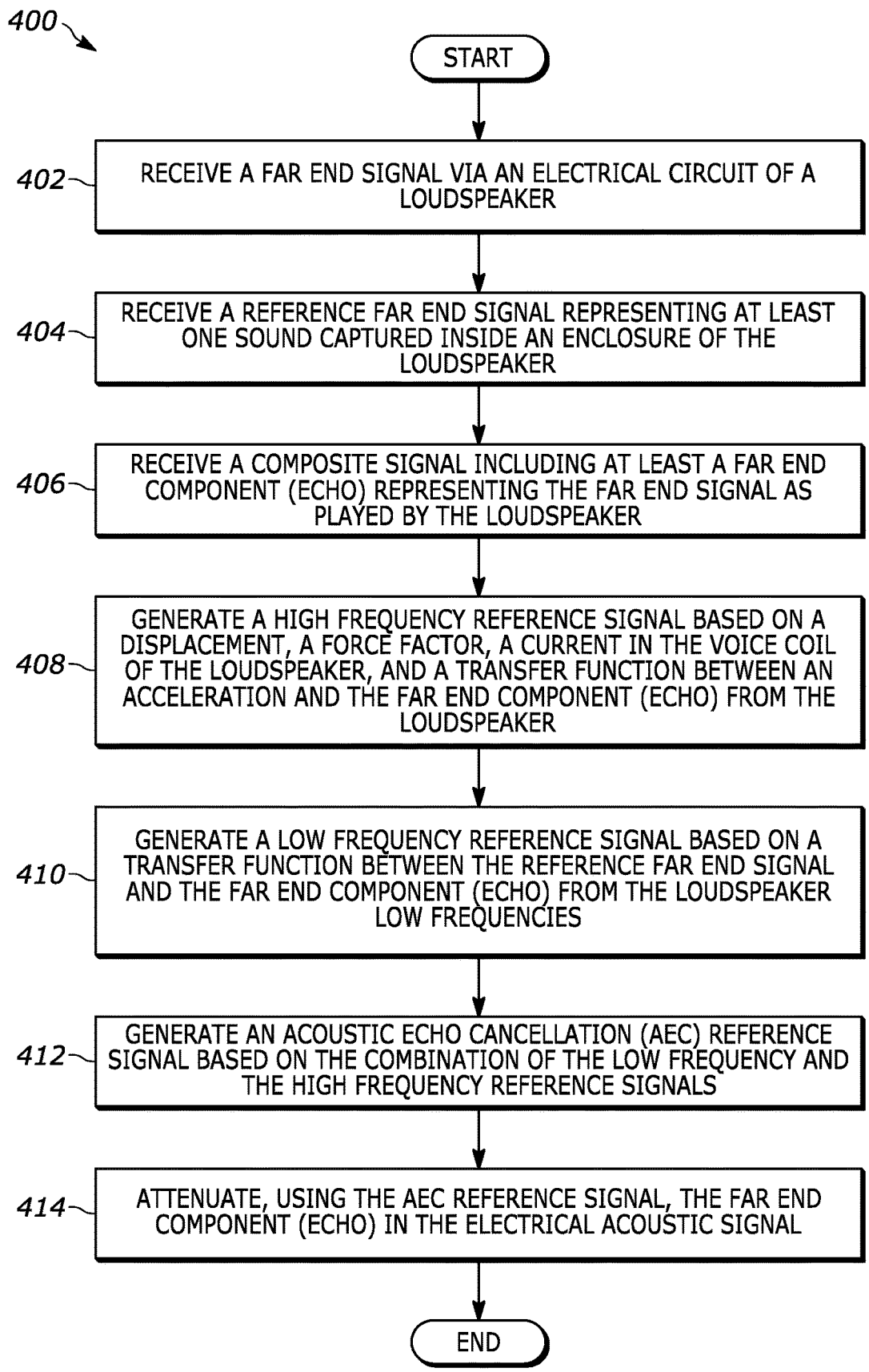
FIG. 4 is a flow diagram illustrating a method for acoustic echo cancellation, according to an example embodiment.

FIG. 4 is a flow diagram showing steps of a method 400 for acoustic echo cancellation, according to an example embodiment.

Example method 400 can commence in block 402 with receiving a far end signal. The far end signal is the signal received by a loudspeaker via an electrical circuit. An example of such an electrical circuit comprising the amplifier 302 and the resistor 304 is shown in FIG. 3.

In block 404 a reference far end signal (i.e. initial reference signal) may be received. The reference far end signal may represent at least one sound captured inside an enclosure of the loudspeaker. The loudspeaker can be operable to play back a far end signal. In some embodiments, the reference far end signal may be captured by a low sensitivity microphone placed inside the enclosure of the loudspeaker.

In block 406, example method 400 can proceed with receiving a composite signal including at least a far end component (echo) representing the far end signal as played by the loudspeaker.

In block 408, example method 400 can generate, using the reference far end signal, a high frequency reference signal based on a displacement of the loudspeaker, a force factor of the loudspeaker, a current in the voice coil of the loudspeaker, and a transfer function between an acceleration and the far end component (echo) from the loudspeaker for mid and high frequencies.

In block 410, example method 400 can generate, using the reference far end signal, a low frequency reference signal based on a transfer function between the reference far end signal and the far end component (echo) from the loudspeaker for low frequencies.

In block 412, example method 400 can generate an acoustic echo cancellation reference signal (a final reference signal) based on the combination of the low frequency and the high frequency reference signals.

In block 414, example method 400 can attenuate, using the AEC reference signal (final reference signal), the far end component in the electrical acoustic signal. In some embodiments, the attenuation of the far end signal includes subtractive cancellation of a filtered version of the reference signal.

Various embodiments of the present technology can be practiced with any audio device configured to receive and/or provide audio such as, but not limited to, cellular phones, hearable devices, smart speakers, IoT devices, phone handsets, headsets, and conferencing systems. It should be understood that while some embodiments of the present technology are described with reference to operations of a cellular phone or a mobile device, the present technology can be practiced with any audio device.

As used herein, the terms "approximately" generally mean plus or minus 10% of the stated value. For example, approximately 0.5 would include 0.45 and 0.55, approximately 10 would include 9 to 11, and approximately 1000 would include 900 to 1100.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The present technology is described above with reference to example embodiments. Therefore, other variations upon the example embodiments are intended to be covered by the present disclosure.

What is claimed is:

1. A method for acoustic echo cancellation, the method comprising:
    generating an initial reference signal representing a far end reference signal including a non-linear component while the loudspeaker is being operated to play back a far end signal;
    generating, from the initial reference signal, a high frequency reference signal using a non-linear function of displacement of a near end loudspeaker as it is being operated to play back the far end signal;
    generating, from the initial reference signal, a low frequency reference signal using a linear function of displacement of the loudspeaker as it is being operated to play back the far end signal;
    generating a final reference signal based on a combination of the low frequency reference signal and the high frequency reference signal; and
    attenuating, using the final reference signal, a far end signal component of a composite signal comprising a near end signal component and the far end signal component.

2. The method of claim 1, wherein generating the initial reference signal comprises generating the initial reference signal using a microphone co-located with the loudspeaker.

3. The method of claim 1, wherein generating the final reference signal includes filtering the high frequency reference signal and the low frequency reference signal and wherein the combination includes combining the filtered high frequency reference signal and the filtered low frequency reference signal.

4. The method of claim 3, wherein filtering the high frequency reference signal and the low frequency reference signal is performed using a common cutoff frequency for both of the high frequency reference signal and the low frequency reference signal.

5. The method of claim 4, wherein the common cutoff frequency is about 1 kHz.

6. The method of claim 1, wherein generating the final reference signal includes:
    forming frequency domain representations of the high frequency reference signal and the low frequency reference signal, the frequency domain representations having signal values for a plurality of frequency components; and
    selecting between the signal values of the frequency domain representations of the high frequency reference signal and the low frequency reference signal for each of the plurality of frequency components.

7. The method of claim 6, wherein the selecting is performed based on a computed residual echo at each of the plurality of frequency components.

8. The method of claim 1, wherein attenuating includes performing subtractive cancellation on the composite signal using the final reference signal.

9. The method of claim 1, wherein generating the high frequency reference signal further includes:
    calculating a displacement of the loudspeaker using the initial reference signal; and estimating a force factor of the loudspeaker using the calculated displacement.

10. The method of claim 9, further comprising:
multiplying the force factor by a current in the loudspeaker to obtain an acceleration; and
generating the high frequency reference signal based on the obtained acceleration.

11. The method of claim 1, wherein generating the low frequency reference signal further includes applying a linear transfer function to the initial reference signal.

12. A device comprising:
a loudspeaker being operable to play back a far end signal;
a first microphone co-located with the loudspeaker and producing an initial reference signal representing a far end reference signal having a non-linear component when the far end signal is produced by the loudspeaker;
a second microphone; and
an acoustic echo cancellation module adapted to generate a high frequency reference signal based on a non-linear function and the initial reference signal, and a low frequency reference signal based on a linear function and the initial reference signal,
the acoustic echo cancellation module being further adapted to generate a final reference signal by combining the high frequency reference signal and the low frequency reference signal,
wherein the acoustic echo cancellation module is further adapted to attenuate, using the final reference signal, a far end signal component of a composite signal detected by the second microphone, the composite signal comprising a near end signal component and the far end signal component.

13. The device of claim 12, wherein the acoustic echo cancellation module further comprises:
a high frequency analyzer adapted to receive the initial reference signal and generate the high frequency reference signal from the initial reference signal using the non-linear function;
a low frequency analyzer adapted to receive the initial reference signal and generate the low frequency reference signal from the initial reference signal using the linear function; and
a combination module to combine the high frequency reference signal and the low frequency reference signal to generate the final reference signal.

14. The device of claim 13, wherein the high frequency analyzer further comprises:
a displacement calculator configured to calculate a displacement of the loudspeaker using the initial reference signal; and
a force factor estimator configured to estimate a force factor of the loudspeaker using the calculated displacement and the non-linear function.

15. The device of claim 14, wherein the high frequency analyzer further comprises:
a multiplier configured to multiply the force factor with a current through the loudspeaker and output an acceleration signal of the loudspeaker; and
a high frequency transfer function generator configured to generate the high frequency reference signal using the acceleration signal.

16. The device of claim 13, wherein the low frequency analyzer further comprises a low frequency transfer function generator configured to generate the low frequency reference signal from the initial reference signal using the linear function.

17. The device of claim 13, wherein the high frequency analyzer further comprises a high pass filter that outputs the high frequency reference signal and the low frequency analyzer further comprises a low pass filter that outputs the low frequency reference signal.

18. The device of claim 12, wherein the high frequency reference signal is a non-linear function of displacement of the loudspeaker as it is being operated to play back the far end signal and the low frequency reference signal is a linear function of displacement of the loudspeaker as it is being operated to play back the far end signal.

19. A method for acoustic echo cancellation, the method comprising:
generating an initial reference signal representing a far end reference signal having a non-linear component produced by a loudspeaker while the loudspeaker is being operated to play back a far end signal;
generating another reference signal that is a non-linear function of displacement of the loudspeaker as it is being operated to play back the far end signal, wherein the another reference signal is one or both of a current sense signal from the loudspeaker and a voltage sense signal from the loudspeaker;
generating a final reference signal based on the another reference signal; and
attenuating, using the final reference signal, a far end signal component of a composite signal comprising the far end signal component and a near end signal component.

20. The method of claim 19, wherein generating the final reference signal includes:
forming frequency domain representations of the initial reference signal and the another reference signal, the frequency domain representations having signal values for a plurality of frequency components; and
selecting between the signal values of the frequency domain representations of the initial reference signal and the another reference signal for each of the plurality of frequency components.

* * * * *